J. JACOB.
CRADLE.
APPLICATION FILED DEC. 10, 1920.
1,400,748.
Patented Dec. 20, 1921.
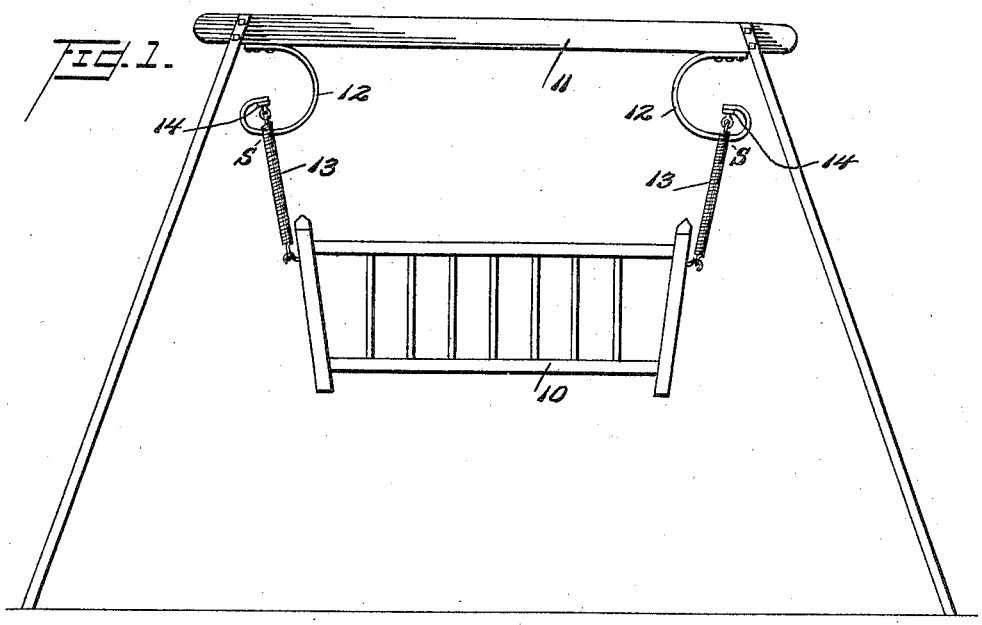
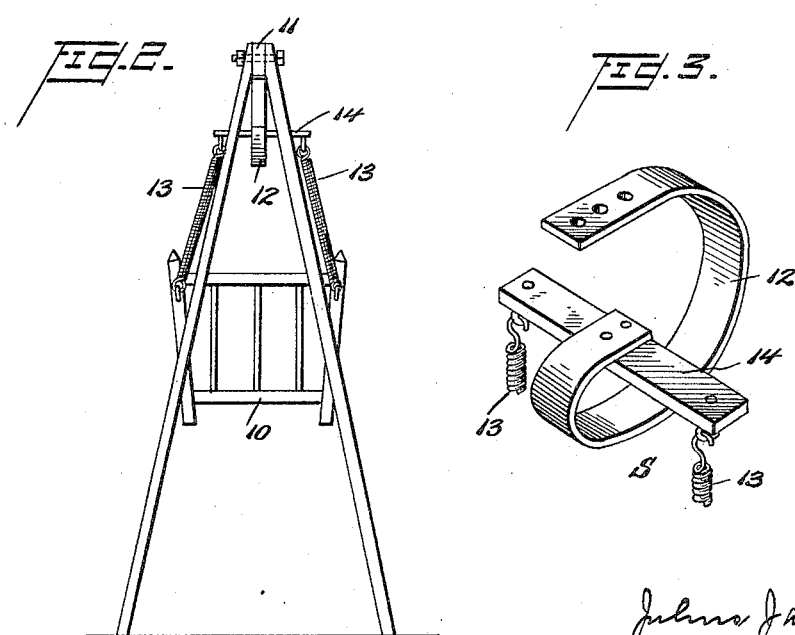
Inventor
Julius Jacob

UNITED STATES PATENT OFFICE.

JULIUS JACOB, OF COLUMBIA, SOUTH CAROLINA.

CRADLE.

1,400,748. Specification of Letters Patent. Patented Dec. 20, 1921.

Application filed December 10, 1920. Serial No. 429,713.

*To all whom it may concern:*

Be it known that I, JULIUS JACOB, a citizen of the United States, and resident of Columbia, in the county of Richland and State of South Carolina, have invented certain new and useful Improvements in Cradles, of which the following is a specification.

The present invention relates to cradles, and particularly to cradles of the type in which the bed portion is suspended from a support instead of being mounted upon legs or rockers. The purpose of the invention is to provide a cradle having novel spring means for suspending the bed portion from the supporting frame whereby it may vibrate as a result of very slight movement of its occupant, the vibrations continuing over a considerable length of time, so that a child lying in the bed portion and moving only slightly and at infrequent intervals will nevertheless have his attention continually engaged by such vibrations, and will not cry out for attention.

It has heretofore been suggested to suspend the bed portion of a cradle from a frame by means of coiled extension springs, but where such springs are used alone, the vibrations of the bed cease very soon after it is given an initial deflection. I have discovered that by using leaf springs in combination with coiled extension springs, that is, by using leaf springs and coiled springs in tandem in suspending the bed portion of the cradle, the latter may be vibrated by much smaller forces and the vibrations will continue over a much longer period of time than when the coiled springs alone are used. In other words, such a system employing leaf springs and coiled springs in tandem, is much more sensitive and will cause vibration of the bed through a longer period of time, than when either coiled springs, or leaf springs, are used alone.

My invention may be embodied in various forms of which the form illustrated in the accompanying drawings and herein described is by way of example only. In the drawings, Figure 1 is a side view of a cradle, the bed portion being suspended from the support by my novel spring means;

Fig. 2 is an end view of the same; and

Fig. 3 is a perspective view of one of the suspending springs.

The bed portion of the cradle is indicated at 10 and the support at 11, these members being of any suitable design, and the novel springs whereby the ends of the bed portion are connected to the frame are indicated at S. Each of these springs S is composite, consisting of a curved leaf spring 12 having one end secured to the support and two coiled extension springs 13 each having one end secured to the cradle and the other end secured to a cross bar 14 mounted on the free end of leaf spring 12. The leaf spring is relatively strong and the coiled extension springs are relatively weak, the exact strength and design of the springs depending upon the weight of the bed portion 10 and the estimated weight of the child which is to occupy the same.

In the use of the cradle a child is placed in the bed portion 10 and the bed portion given an initial downward deflection and released. The leaf springs 12 being considerably stronger than the coiled springs 13, spring upwardly much more rapidly, thereby bringing about an additional deflection of the coiled springs, giving an increase in the amplitude of vibration of the bed portion over that which it would otherwise have if no leaf spring were employed. After the bed has reached the uppermost point of its travel, it will start downwardly, first stretching the springs 13 and finally deflecting springs 12 which immediately attempt to resume their original position and, acting as before in advance of the springs 13 they impart an increased deflection to the latter thereby causing a greater throw of the bed portion. It is found that the leaf and coiled springs so supplement each other that the system is very sensitive and that the bed portion of the cradle will vibrate for three or four minutes after having been given an initial deflection. Obviously when occupied by a child who makes occasional movements, the bed portion will remain in a constant or nearly constant state of vibration and the attention of the child will be so engrossed by its movement, that it will not miss the attention of other persons for which it would otherwise cry out.

The invention may be embodied in different forms, and is not limited in scope to the exact form described and illustrated.

Having thus described the invention what is claimed as new and desired to be secured by Letters Patent is:

In a cradle, in combination, a frame having an elevated horizontal bar, spaced leaf springs secured to said bar and extending downwardly therefrom the upper and lower ends of said leaf springs being substantially in vertical alinement, a cross bar secured to the lower end of each spring, a cradle, and a coiled tension spring connecting an end of each cross bar to one corner of the cradle.

In testimony whereof I affix my signature.

JULIUS JACOB.